United States Patent
Barlow et al.

(10) Patent No.: US 7,036,001 B2
(45) Date of Patent: Apr. 25, 2006

(54) VECTOR PROCESSING SYSTEM

(75) Inventors: Stephen Barlow, Cambridge (GB); Neil Bailey, Cambridge (GB); Timothy Ramsdale, Cambridge (GB); David Plowman, Saffron Walden (GB); Robert Swann, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 567 days.

(21) Appl. No.: 10/284,194

(22) Filed: Oct. 31, 2002

(65) Prior Publication Data

US 2003/0163667 A1    Aug. 28, 2003

(30) Foreign Application Priority Data

Oct. 31, 2001    (GB) ................... 0126133

(51) Int. Cl.
*G06F 15/80*    (2006.01)
(52) U.S. Cl. .................. 712/222; 712/22
(58) Field of Classification Search ......... 712/22, 712/3, 222
See application file for complete search history.

(56) References Cited

U.S. PATENT DOCUMENTS

| | | | |
|---|---|---|---|
| 6,343,356 B1 * | 1/2002 | Pechanek et al. | 712/210 |
| 6,366,999 B1 * | 4/2002 | Drabenstott et al. | 712/24 |
| 6,530,012 B1 * | 3/2003 | Wilson | 712/22 |
| 6,839,728 B1 * | 1/2005 | Pitsianis et al. | 708/404 |

FOREIGN PATENT DOCUMENTS

WO    WO 99/21078 A    4/1999

OTHER PUBLICATIONS

Search Report for GB 0126133.8 dated Apr. 2, 2003.

* cited by examiner

*Primary Examiner*—William M. Treat
(74) *Attorney, Agent, or Firm*—McAndrews, Held & Malloy

(57) ABSTRACT

A vector processing system for executing vector instructions, each instruction defining multiple pairs of values, an operation to be executed on each of said value pairs and a scalar modifier, the vector processing system comprising a plurality of parallel processing units, each arranged to receive one of said pairs of values and to implement the defined operation on said value pair to generate a respective result; and a scalar result unit for receiving the results of the parallel processing units and for using said results in a manner defined by the scalar modifier to generate a single output value for said instruction.

20 Claims, 8 Drawing Sheets

| | | | |
|---|---|---|---|
| | 32 | Rb_V | Immed(0) |
| | 33 | Rb_USX | Immed(1) |
| | 34 | Rb_XY(0) | Immed(2) |
| | 35 | Rb_XY(1) | Immed(3) |
| | 36 | Rb_XY(2) | Immed(4) |
| Half-word 2 | 37 | Rb_XY(3) | Immed(5) |
| | 38 | Rb_X(4) | Cond(0) |
| | 39 | Rb_X(5) | Cond(1) |
| | 40 | Rb_Y(4) | Cond(2) |
| | 41 | Rb_Y(5) | SETF |
| | 42 | Rb_IMM | |
| | 43 | Ra_XY(0) | |
| | 44 | Ra_XY(1) | |
| | 45 | Ra_XY(2) | |
| | 46 | Ra_XY(3) | |
| | 47 | Ra_X(4) | |
| | 16 | Ra_X(5) | |
| | 17 | Ra_Y(4) | |
| | 18 | Ra_Y(5) | |
| | 19 | Ra_USX | |
| | 20 | Ra_V | |
| | 21 | Rdab_SX(0) | |
| | 22 | Rdab_SX(1) | |
| | 23 | Rdab_SX(2) | |
| Half-word 1 | 24 | Rd_XY(0) | |
| | 25 | Rd_XY(1) | |
| | 26 | Rd_XY(2) | |
| | 27 | Rd_XY(3) | |
| | 28 | Rd_X(4) | |
| | 29 | Rd_X(5) | |
| | 30 | Rd_Y(4) | |
| | 31 | Rd_Y(5) | |
| | 0 | Rd_USX | |
| | 1 | Rdab_16BI | |
| | 2 | Rd_V | |
| | 3 | I(0) | |
| | 4 | I(1) | |
| | 5 | I(2) | |
| Compact 48-bit Encoding Half-word 0 | 6 | I(3) | |
| | 7 | I(4) | |
| | 8 | I(5) | |
| | 9 | CMPT=1 | |
| | 10 | 0 | |
| | 11 | 0 | |
| | 12 | 0 | |
| | 13 | 0 | |
| | 14 | 0 | |
| | 15 | 0 | |

If Rb IMM = 1 (bracket covering rows 32–41 right column)

FIG. 7(I)

| Bit | Field | Extra | Condition |
|---|---|---|---|
| 32 | Rb_V | Immed(0) | |
| 33 | Rb_CIRC | Immed(1) | |
| 34 | Rb_XY(0) | Immed(2) | |
| 35 | Rb_XY(1) | Immed(3) | |
| 36 | Rb_XY(2) | Immed(4) | If Rb_IMM = 1 |
| 37 | Rb_XY(3) | Immed(5) | or Rb_IMM2 = 1 |
| 38 | Rb_X(4) | Immed(6) | |
| 39 | Rb_X(5) | Immed(7) | |
| 40 | Rb_Y(4) | Immed(8) | |
| 41 | Rb_Y(5) | Immed(9) | |
| 42 | Rb_IMM | | |
| 43 | Ra_XY(0) | | |
| 44 | Ra_XY(1) | | |
| 45 | Ra_XY(2) | Ra_X(2) | If Ra SP = 1 |
| 46 | Ra_XY(3) | Ra_X(3) | |
| 47 | Ra_X(4) | | |

Half-word 2

| Bit | Field | Extra | Condition |
|---|---|---|---|
| 16 | Ra_X(5) | | |
| 17 | Ra_Y(4) | | |
| 18 | Ra_Y(5) | | |
| 19 | Ra_CIRC | | |
| 20 | Ra_V | SETF | If Ra_SP = 1 |
| 21 | Rd_SX(0) | | |
| 22 | Rd_SX(1) | | |
| 23 | Rd_SX(2) | | |
| 24 | Rd_XY(0) | | |
| 25 | Rd_XY(1) | | |
| 26 | Rd_XY(2) | | |
| 27 | Rd_XY(3) | | |
| 28 | Rd_X(4) | | |
| 29 | Rd_X(5) | | |
| 30 | Rd_Y(4) | | |
| 31 | Rd_Y(5) | | |

Half-word 1

| Bit | Field |
|---|---|
| 0 | Rd_CIRC |
| 1 | Rd_16BIT |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=0 |
| 10 | 0 |
| 11 | 0 |
| 12 | 0 |
| 13 | 0 |
| 14 | 0 |
| 15 | 0 |

Half-word 0

Full 80-bit Encoding

FIG. 7(II)

| | | |
|---|---|---|
| 64 | SRU_SX(0) | |
| 65 | SRU_SX(1) | |
| 66 | SRU_SX(2) | |
| 67 | SRU(0) | |
| 68 | SRU(1) | |
| 69 | Rep(0) | |
| 70 | Rep(1) | |
| 71 | Rep(2) | |
| 72 | REPLT | |
| 73 | ACC | |
| 74 | CLRA | |
| 75 | Cond(0) | |
| 76 | Cond(1) | |
| 77 | Cond(2) | |
| 78 | SETF | |
| 79 | - | |

Half-word 4: bits 64–79

| | | |
|---|---|---|
| 48 | Rd_++ | |
| 49 | Ra_SX(0) | |
| 50 | Ra_SX(1) | |
| 51 | Ra_SX(2) | |
| 52 | Ra_x++ | |
| 53 | Ra_Y(0) | |
| 54 | Ra_Y(1) | |
| 55 | Ra_y++ | Ra_Y(2) |
| 56 | Ra_16BIT | Ra_Y(3) |
| 57 | Ra_SP | |
| 58 | Rb_++ | Immed(10) |
| 59 | Rb_16BIT | Immed(11) |
| 60 | Rb_SX(0) | Immed(12) |
| 61 | Rb_SX(1) | Immed(13) |
| 62 | Rb_SX(2) | Immed(14) |
| 63 | Rb_IMM2 | Immed(15) |

Half-word 3: bits 48–63

If Ra_SP = 1

If Rb_IMM = 1 or Rb_IMM2 = 1

If Rb_IMM = 1

FIG. 7(III)

VECTOR PROCESSING SYSTEM

The present invention relates to a vector processing system.

It is increasingly the case that processors are being purpose built to fulfil the requirements of particular applications. The present invention concerns particularly, but not exclusively, a processor architecture for use in image processing or other multi-media applications.

Existing processor architectures use differing combinations of so-called scalar units and vector units. In the following, a scalar unit implies a unit capable of executing instructions defining a single operand set, that is, typically operating on a pair of source values and generating a destination value for each instruction. A vector unit operates in parallel on a plurality of value pairs to generate a plurality of results. These are often provided in the form of packed operands, that is two packed operands provide a plurality of value pairs, one from each operand in respective lanes.

Existing processor architectures use a scalar processor unit for multi-media processing. However, because there is little or no parallelism in this approach, the processor has to run very quickly. Even if the processor is capable of running quickly, it will be inefficient in terms of power consumption.

Other approaches have considered the coupling of a scalar processor with a vector processing unit. However, it is difficult to establish an architecture in which the advantages of the scalar unit and the vector processing unit can be maximised without placing restrictions on the processor operation. For example, if the vector unit is a separate processor it is difficult to achieve sufficiently tight integration to enable the scalar unit and the vector unit to work efficiently together. Alternatively, if the vector unit is part of the same processor as the scalar unit, it is difficult to construct a unit with sufficient parallelism but which can communicate intelligently enough with the scalar unit. It is also difficult for the scalar unit to keep the vector unit fed with enough data to achieve significant performance gains.

It is an aim of the present invention to overcome or at least mitigate such problems.

According to one aspect of the present invention there is provided a processor comprising: a vector processing system for executing vector instructions, each instruction defining multiple pairs of values, an operation to be executed on each of said value pairs and a scalar modifier, the vector processing system comprising a plurality of parallel processing units, each arranged to receive one of said pairs of values and to implement the defined operation on said value pair to generate a result; and a scalar result unit for receiving the results of the parallel processing units and for using said results in a manner defined by the scalar modifier to generate a single output value for said instruction.

Another aspect of the invention provides a method of executing computer instructions, each instruction defining multiple value pairs, an operation to be executed and a scalar modifier, the method comprising: supplying respective value pairs to each of a plurality of parallel processing units; supplying the operation to be executed to each of the parallel processing units such that they each implement that operation on their input value pair to generate a result; and supplying the scalar modifier to a scalar result unit which receives the results of the parallel processing unit and which processes said results in a manner defined by the scalar modifier to generate a single output value.

A still further aspect of the invention provides a computer program comprising a sequence of instructions including vector instructions, each instruction defining multiple value pairs, an operation to be executed in the scalar modifier, when the computer program is loadable into a processor and co-operable therewith such that the operation defined by the instruction is executed on each of said value pairs to generate a respective result, and the scalar modifier determines how said results are processed to generate a single output value.

In a particularly preferred embodiment of the invention, each processing unit comprises at least one flag and is selectable for operation in dependence on a condition defined by said at least one flag, when compared with a condition defined in the vector instruction to be executed.

In the described embodiment of the invention, a processor comprises a vector processing system as herein above defined together with a scalar processing system. The scalar processing system comprises a scalar register file having a plurality of registers and a scalar execution unit for executing an operation on a single pair of input values and generating an output result. The scalar processing system is referred to in the following as the "scalar unit".

In the embodiment which is described, the semantics of the vector instructions and scalar instructions are flexible enough that a vector instruction can define source values either in the vector unit, in the scalar unit or in a data memory. Moreover, the vector unit can return its results either back to the vector unit itself or to the scalar unit, via the scalar result unit.

This provides flexibly coupled vector and scalar processing units which can communicate effectively with each other to maximise the advantages of each unit.

As will be seen in the following, the organisation of the instructions is such that the instructions most suited to each unit are organised into vector instructions and scalar instructions which are detected at the decode stage and supplied respectively to the appropriate unit for execution. Each vector instruction can identify two source packed operands, each operand containing a plurality of values in respective lanes. In the following, which describes a graphics processor, values are often referred to therein as pixels, because they represent the same.

For a better understanding of the present invention, and to show how the same may be carried into effect, reference will now be made by way of example to the accompanying drawings, in which:

FIG. 7 illustrates 48 bit and 80-bit encodings of vector instruction; and

Figure 1:
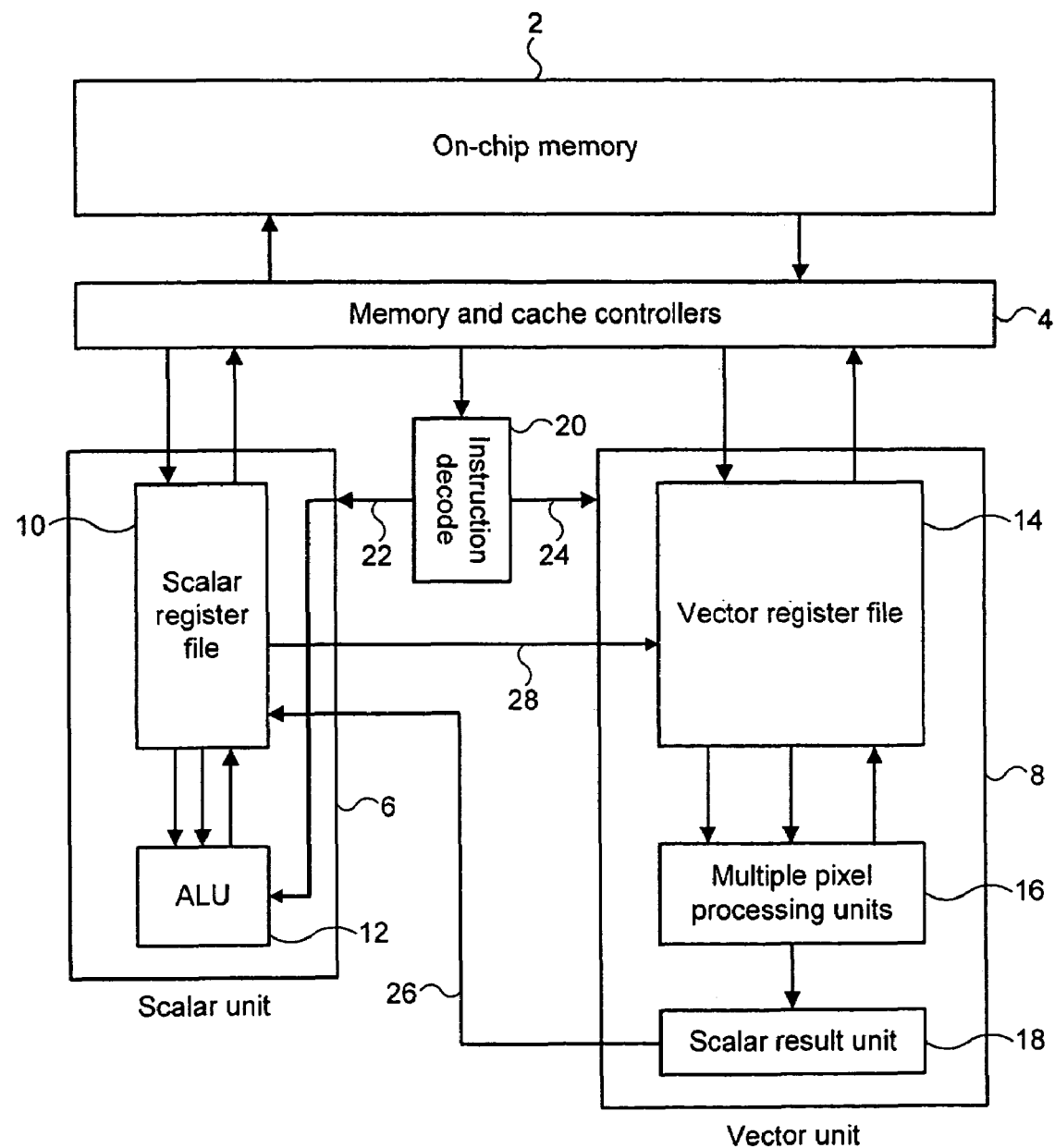
FIG. 1 is a schematic block diagram of the processor architecture.

FIG. 1 is a schematic block diagram of a processor in accordance with one embodiment of the invention. An on-chip memory 2 holds instructions and data for operation of the processor. Memory and cache controllers denoted generally by a block 4 control communication of instructions and data from the on-chip memory with the two main processing units of the processor. The first main processing unit 6 is a scalar unit and the second main processing unit 8 is a vector unit. The construction and operation of these units will be described in more detail in the following. In brief, the scalar unit 6 comprises a scalar register file 10 and an ALU processing block 12. The vector unit 8 comprises a vector register file 14, a plurality of pixel processing units (PPU) denoted generally by a block 16 and scalar result unit 18. An instruction decoder 20 receives a stream of instructions from the on-chip memory 2 via the memory and cache controllers 4. As will be discussed in more detail hereinafter, the instruction stream comprises distinct scalar and vector instructions which are sorted by the instruction decoder 20 and supplied along respective instruction paths 22, 24 to the scalar unit and to the vector unit depending on the instruction encoding. The results generated by the vector unit, in particular in the scalar result unit 18, are available to the scalar register file as denoted by arrow 26. The contents of the scalar register file are available to the vector register file as indicated diagrammatically by arrow 28. The mechanism by which this takes place is discussed later.

FIG. 1 is a schematic view only, as will be apparent from the more detailed discussion which follows. In particular, the processor includes an instruction cache and a data cache which are not shown in FIG. 1 but which are shown in subsequent figures.

Before discussing the detail of the processor architecture, the principles by which it operates will be explained.

The scalar and vector units 6, 8 share a single instruction space with distinct scalar and vector instruction encodings. This allows both units to share a single instruction pipeline, effectively residing in the instruction decoder 20. Instructions are dispatched sequentially to either the scalar unit 6 (in fact to the ALU processing unit 12 of the scalar unit 6) or to the vector unit 8, depending on their encodings, where they run to completion as single atomic units. That is, the control and instruction decode module 20 within the scalar unit 6 wait for the previous instruction to complete before issuing a new instruction, even if the relevant unit is available to execute the new instruction.

The scalar unit 6 and vector unit 8 operate independently. However, communication between the two units is available because of the following two facets of the processor architecture. Both units can read and write data in the main on-chip memory 2. In addition, the vector unit can use registers in the register file 10, immediate values (fixed values defined in an instruction) and main memory accesses using values held in the scalar register file 10. The result of a vector operation in the vector unit 8 can then be written back into one of these scalar registers from the scalar result unit 18.

Figure 2:
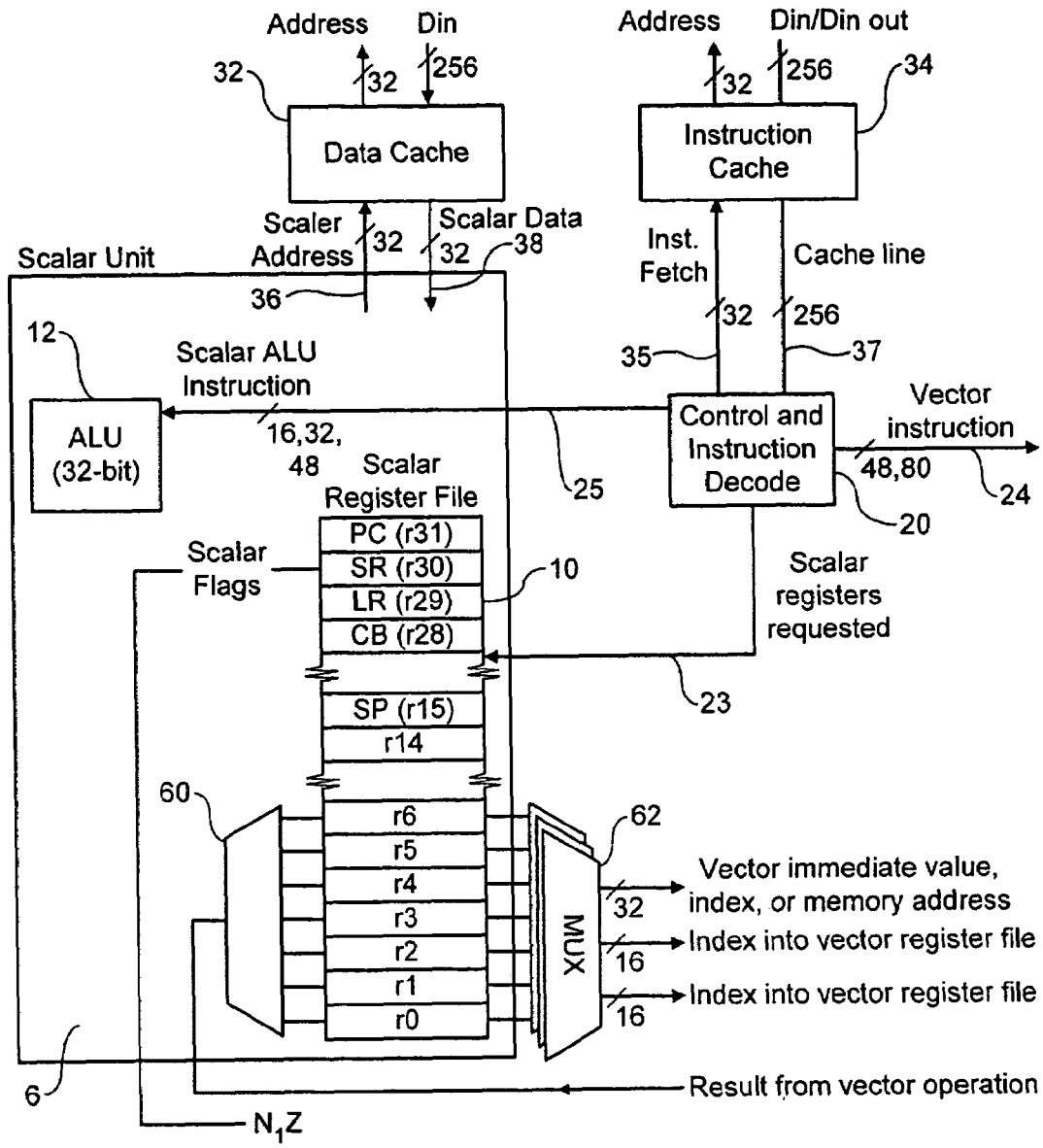
FIG. 2 is a schematic diagram of the scalar unit.

The scalar unit will now be described with reference to FIG. 2. The scalar unit communicates with an instruction cache 32 and a data cache 34 in a conventional fashion. In particular, the control and instruction decode module 20 issues instruction fetches along bus 36 and receives instructions along instruction cache line 38. A 256-bit sequence is received along cache line 38 for each instruction fetch, the number of instructions in each fetch depending on their encodings. Scalar addresses are supplied to the data cache 34 via bus 35 and data returned along bus 37. The control and instruction decode module 20 supplies scalar instructions along path 23 to the ALU block 12 and vector instructions to the vector unit 8 along instruction path 24. The decision as to where to route an instruction is based on the instruction encodings as will be discussed in more detail in the following.

The scalar unit 6 also incorporates a scalar register file. There are thirty two 32-bit registers which are labelled $r_0 \ldots r_{31}$ in the scalar register file 10. The bottom sixteen registers $r_0$ to $r_{15}$ form the main working registers of the processor, accessible by all but a few specialised instructions. A subset of these working registers, the so-called core registers labelled $r_0$ to $r_6$, are available to the vector unit 8. These registers can be used to hold an immediate value, as an index into the vector register file, as an address for vector memory accesses or for storing results of vector operations.

The function of the other registers is not material to the present invention and is therefore not discussed further herein. It is however pointed out that one of the registers, $r_{31}$ constitutes the program counter which points to the address of the current instruction and thus is used to control instruction fetches. The scalar instruction set uses a standard encoding of 16 bits, with 32 bit and 48 bit variants to cater for large immediate and offset values.

As a practical matter, the instruction decode unit 20 decodes the incoming instruction and sets a large number of control lines according to the instruction receive. These control lines spread throughout the rest of the chip. Some of them feed into the scalar unit (some (23) to the scalar register file, some (25) to the scalar ALU). These lines are used when the instruction received was a scalar one.

Other lines feed into the vector unit 8 along path 24. These are distributed so that some lines feed to the vector register file 14, some to the PPUs 16 and so forth. These are used when the instruction was a vector one. In the case of the PPUs, there are six control lines feeding identically from the instruction decode unit 20 into each of the 16 PPUs. In fact, these lines are set directly from the "opcode bits" in the vector instruction (discussed later).

Each PPU will individually examine these six control lines and perform a single operation on its inputs according to the current setting. Each of the 64 possible settings represents a single specific instruction (though not all are currently used). A similar arrangement exists for the scalar ALU. When a scalar instruction is received, the instruction decode unit finds the correct "opcode bits" in the instruction and passes them along the control lines that run to the scalar ALU.

Figure 3:
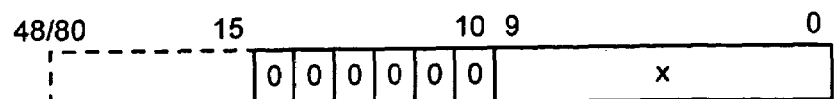
FIG. 3 illustrates bits 0 to 15 of a vector instruction.

FIG. 3 illustrates bits 0 to 16 of a vector instruction. Of particular importance, it is to be noted that the 6 bit sequence 000000 in bits 10 to 15 of the instruction indicate that the instruction is not a scalar instruction but is in fact a vector instruction. This allows the instruction decoder 20 to distinguish between scalar instructions and vector instructions. Vector instructions are described in more detail later.

The vector unit 8 will now be described with reference to FIG. 4. The vector unit comprises sixteen 16 bit pixel processing units $PPU_0 \ldots PPU_{15}$ which operate in parallel on two sets of sixteen values. These sets of values can be returned as packed operands from the vector register file 14, from the scalar register file 10 or from the main memory 2. The results of the PPU operations are handled as described later.

The detail of the vector register file 14 is not germane to the present invention and therefore is not described in detail herein. However, it is to be noted that groups of sixteen contiguous pixels are written or read at once, each pixel value being represented by an 8-bit or 16-bit sequence.

Figure 5:
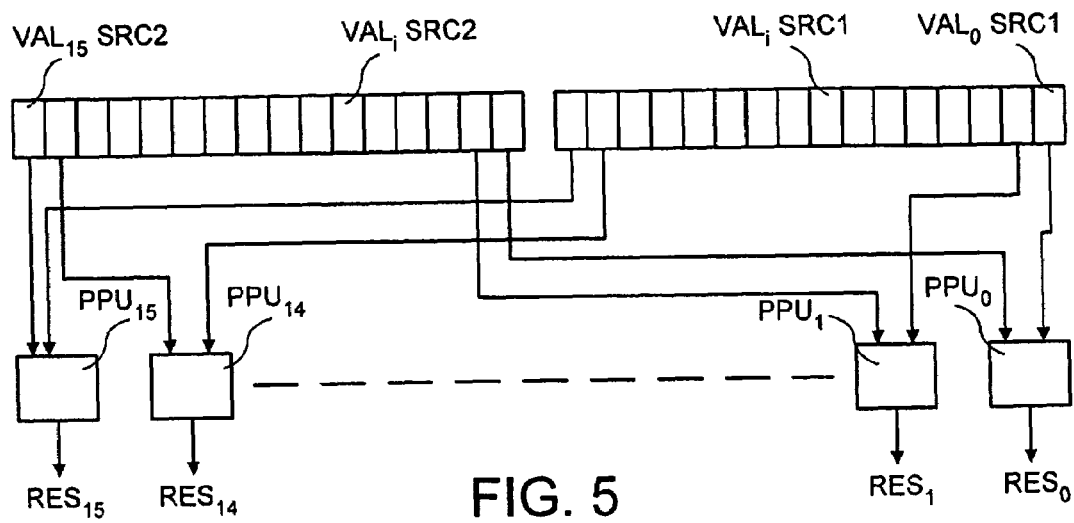
FIG. 5 is a schematic diagram illustrating parallel operation of multiple pixel processing units in the vector unit.

As illustrated in FIG. 5, each pixel processing unit PPUi acts on two values. When the processor is a graphics processor, each value relates to a pixel. The vector instructions supply two operands to the pixel processing unit. These are labelled SRC1, denoting a first packed operand and SRC2, denoting a second packed operand in FIG. 5. Each operand comprises a plurality of values, in the described embodiment sixteen 16-bit values. A value from each operand is supplied to each pixel processing unit 16, such that PPUi operates on the ith element of the 16 element factors (operands) that have been processed simultaneously. An individual result is generated by each pixel processing unit, the result being labelled RESi in FIG. 5.

The pixel processing units $PPU_0 \ldots PPU_{15}$ will now be described with reference to FIG. 6. Each of the pixel processing units contains an ALU 50 which operates on two input 16-bit values VAL; SRC1, VAL; SRC2 supplied along two of three input paths 52, 53, 54 depending on their origin, to port MEM, to port A and port Op2 to create a single output value RESi, according to the operation that has been selected by the vector instruction. A multiplexer 57 selects two of the three input paths. Each pixel processing unit 16 has Z, N and C flags denoted generally by the flag block 56. The Z flag denotes a zero flag, the N flag denotes a negative flag and the C flag is a carry flag. The state of these flags can be used to define a condition which can be compared with a condition defined in a vector instruction to select or deselect an individual PPU. Each pixel processing unit includes an adder 58 and an accumulator 59, which allow the result of the ALU operation to be accumulated and then returned. The thus accumulated value is denoted $V_{acc}$. The output of each pixel processing unit 16 is supplied at port D to the vector register file and to the scalar result unit 18. In particular, the values that emerge from the PPUs are in essence always fed both back to the VRF and to the SRU. There are just a few qualifications, including the possibility that the destination register of a vector instruction may be given as "-" meaning "do not write the result back". In this case no values are returned to the VRF. The values are still passed on to the SRU as usual, however. In essence, there are two "destinations", one for the results from the PPUs 16 and one for the final result from the SRU.

Each pixel processing unit PPUi also includes three AND gates 70, 72, 74. These AND gates receive accumulate ACC and clear CLRA inputs respectively, the function of which is described in more detail later. These inputs are derived from modifiers contained in the vector instructions. Other instruction modifiers IFxx, SET F, are supplied to flag block 56 along paths 76, 78 respectively. Once again, the function of these modifiers will be discussed later.

The scalar result unit 18 operates on the outputs of the pixel processing unit 16, depending on the operation defined in the vector instruction supplied to the vector unit. This value is then written back to the scalar register file 10 in the scalar unit 6 and the scalar flags N, Z are updated according to it. A demultiplexer 60 (FIG. 4) in the scalar unit 6 writes the value to the correct one of the core registers $r_0 \ldots r_6$. Likewise, a set of multiplexers 62 supply the outputs of the core registers $r_0 \ldots r_6$ to the vector register file via address calculation logic 64 according to whether the value is a vector immediate value, index or memory address of 32 bits, or respective 12 bit indices into the vector register file.

Values can be supplied to the pixel processing units 16 in a number of different ways. The use of a 12 bit index creates an address via address calculation logic 64A into the vector register file into the port marked $A_{addr}$. This causes data held in the vector register file to be supplied to the pixel processing units 16 into port A along path 52 in FIGS. 4 and 5. Data can also be accessed from port B by using an index which has created an address for the vector register file into the port marked $B_{addr}$.

This data can be supplied to the port Op2 of the pixel processing unit 16 via a multiplexer 64. Multiplexer 64 also allows for data to be accessed directly from the scalar register file 10 by taking a value held in one of the core registers $r_0 \ldots r_6$ and supplying it through a replicate unit 66, which replicates at 16 times.

Figure 4:
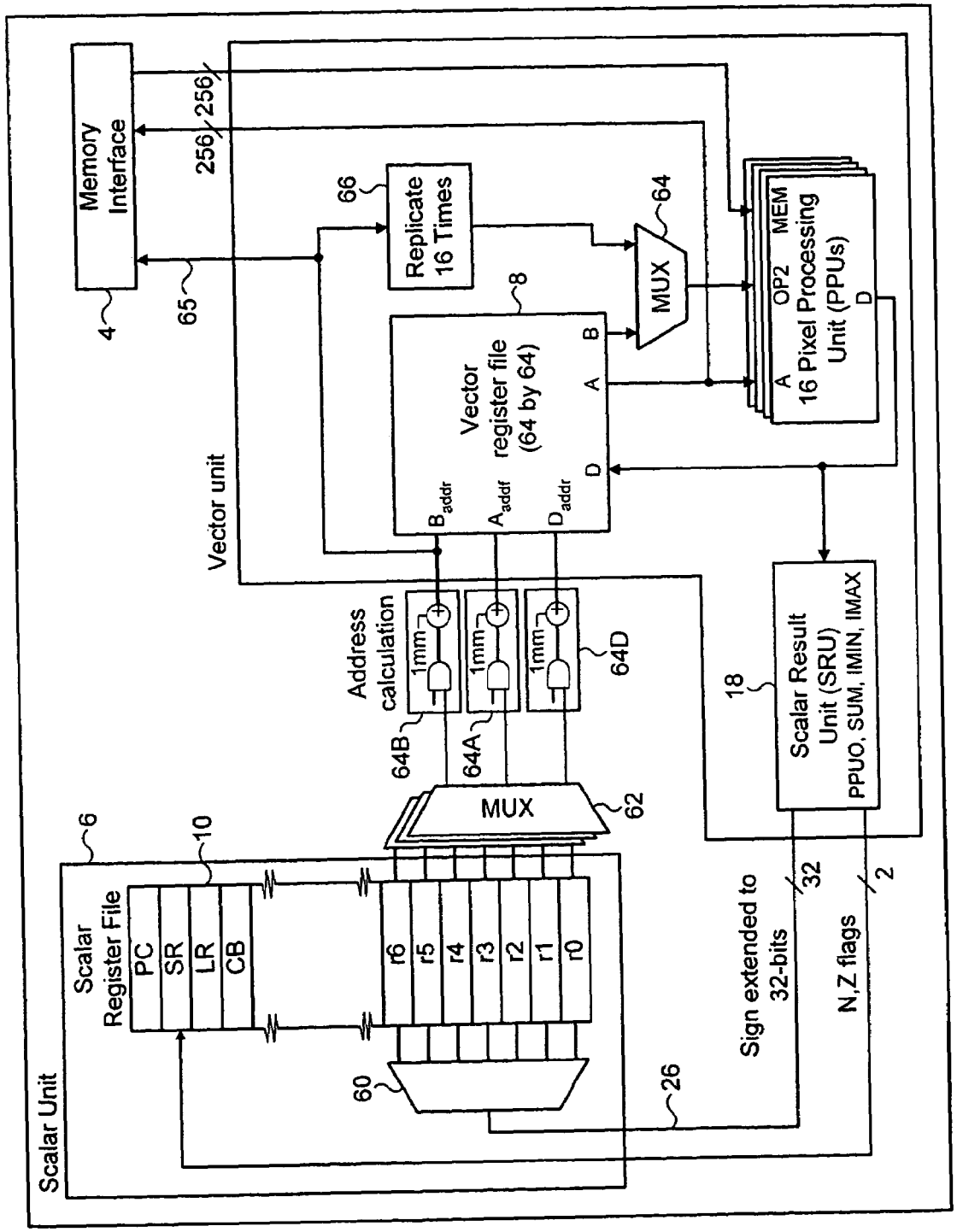
FIG. 4 is a schematic block diagram of a vector unit.

An alternative supply of data to the pixel processing unit 16 is directly from on-chip memory 2 via the memory interface 4 (FIG. 4). In this case, an address calculated by address calculation logic 64B is used as an address into main memory along address bus 65, and data access thereby is supplied to port MEM of the pixel processing unit.

The replicate unit 66 can also act on an immediate value in a vector instruction as well as on the contents of a core register in the scalar register file 10.

Figure 6:
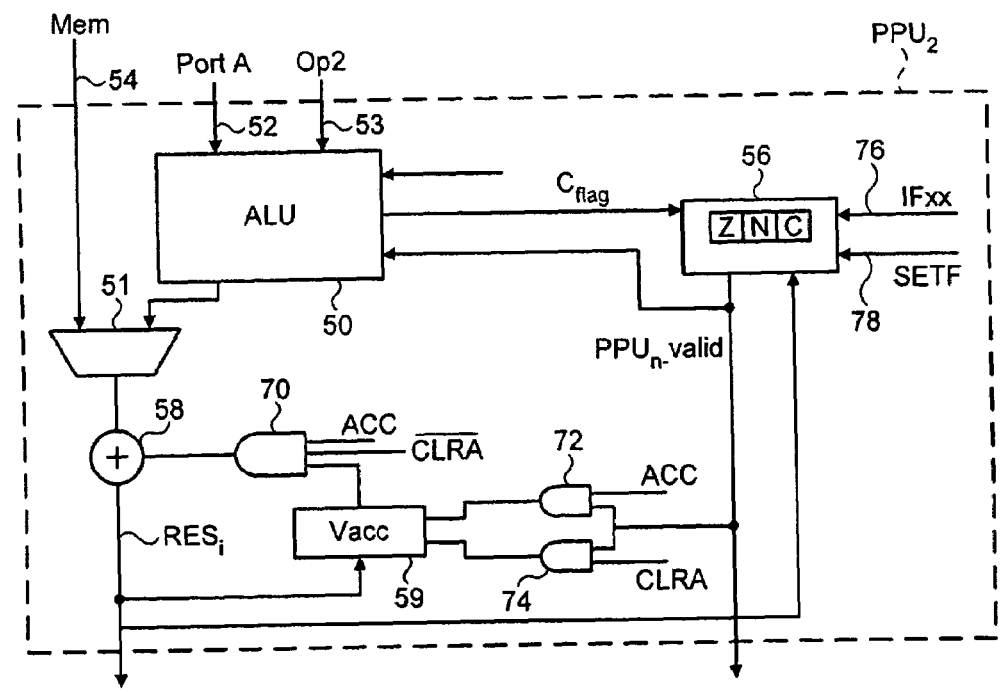
FIG. 6 is a schematic diagram illustrating the internal circuitry of pixel processing units.

From this discussion it will be appreciated that the input labelled 54 in FIG. 6 to the pixel processing units can supply either values from the vector register file, values from the scalar register file or values directly from memory to the ALU.

With a small number of exceptions, almost all vector instructions have a general three operand form:

<operation>R(yd,xd), R(ya,xa), Op2[<modifiers>]

where operation is the name of the operation to be performed, and registers in the vector register file are generically denoted R(y,x) due to the addressing semantics of the vector register file (not discussed herein). In the above example R(yd,xd) is the destination register, R(ya,xa) is the first source register and Op2 may indicate a second source register R(yb,xb), or a value taken from one of the scalar registers $r_0$ to $r_6$, or an immediate value (these latter two being repeated identically across all sixteen PPUs), as explained above. Finally <modifiers> are selected from an optional list of instruction modifiers which control how the PPUs 16 and the scalar result unit handle the results of the ALU operations in each PPU. The present invention is particularly concerned with the scalar result unit, but the following description also discusses modifiers which affect the PPUs.

Once such modifier affecting the PPU is the "accumulate" modifier ACC. This modifier instructs the pixel processing unit 16 to add the result of the ALU operation to the current value of the accumulator 59. This addition is always performed using 16 bit signed saturating arithmetic. When the "accumulate" modifier ACC is specified, then the accumulated value, not the output of the ALU, becomes the final output read by the pixel processing unit. This means that the accumulated value will be written back to the destination register at port D.

The vector instructions operate on the pixel processing unit 16 in the following way.

Each of the sixteen pixel processing units is presented with two 16-bit values, one derived from R(ya,xa) and one derived from Op2(Note that if 8-bit values are read from the vector register file then these are zero extended into 16-bit values.)

Each pixel processing unit performs As operation in accordance with the nature of the operation defined in the instruction. The operation is executed by the ALU 50. If an instruction modifier specifies accumulation of the results, then this takes place. In this case the accumulated values are returned as the final output values of the pixel processing units 16, otherwise the output of the ALU operation is returned as the final output of the pixel processing unit. The scalar result unit 18 performs any calculations indicated by scalar modifiers in the vector instruction. The scalar result unit operates on the final results from the pixel processing units 16 to generate an output value which may be written to one of the scalar registers $r_0$ to $r_6$, and the scalar flags will be set accordingly. The final outputs of the pixel processing units are also written back to the vector register file at port D (in FIGS. 4 and 6).

The vector instruction set can be thought of as being constituted by four types of instructions:
- load/store instructions
- move instruction
- data processing instructions
- look up instructions.

It is to be noted that in writing the program, all vector instructions are preceded by v to denote that they are vector instructions. In the encoding, bits 10 to 15 are set to zero so that the fact that they are vector instructions can be recognised by the instruction decoder. Each instruction type has an 80-bit full encoding, and a compact 48-bit encoding. By way of example, FIG. 6 illustrates the compact 48-bit encoding and full 80-bit encodings for data -processing instructions of the following form:

<operation>R(yd,xd),R(ya,xa),Op2.

Note that all instructions contain six bits to hold opcode (bits 3 to 8 of Half-Word 0, labelled I[0] to I[5]) identifying the nature of the instruction. Also note that bit 9 labelled CMPT is a flag which is set to one to indicate a compact 48-bit encoding and zero to indicate the full 80-bit encoding. The scalar modifier bits are SRU[ ]. SRU[0] and SRU[1] select the operation (PPU0, IMIN etc.), and SRU_SX[0] to SRU_SX[2] choose which scalar register, $r_0$ to $r_6$, the result is returned to.

The main categories of vector instructions are discussed below.

Load/Store Instructions

Vld R(yd,xd), (rx+#immediate)

Load sixteen consecutive bytes or sixteen bit half words from memory into the vector register file.

The load instructions identify a destination register in the vector register file and identify a source operand by virtue of its address in main memory. Its address in main memory is calculated from the content of a register rx in the scalar register file 10 using the address calculation logic $64_B$ and the resulting operand is supplied to port MEM.

The store instructions identify a set of operands in the vector register file and cause them to be stored back to memory at an address identified using the contents of a scalar register. The instruction has the following format:

Vst R(ya,xa), (rx+#immediate).

Store sixteen consecutive bytes or half words from the VRF back to memory. The memory address is calculated using the address calculation logic $64_B$ as before.

In both cases, if R(y,x) denotes an 8-bit register, sixteen bytes are stored. If R(y,x) denotes a 16-bit register, half words are stored.

Move Instructions vmov R(yd,xd), Op2 moves OP2 to R(yd,xd).

In this case, Op2 may be a value from a scalar register rx, or an immediate value or an immediate value plus the value from a scalar register rx, or a VRF register R(yb,xb) accessed from port B in FIG. 4. In this case therefore there are a number of options for identifying the location of the source value, the destination location being identified in the vector register file.

Data Processing Instructions

All these instructions take the usual form:

<operation>R(yd,xd) R(ya,xa) Op2.

A number of different operations can be specified, including addition, subtraction, maximum, minimum, multiply, etc.

Look-up instructions are specialised instructions having the form:

vlookup R (yd,xd)

and are not discussed further herein. They allow access to the vector register file, the addressing semantics of which are not discussed further herein.

As mentioned above, the scalar result unit 18 can implement different operations as defined by modifiers in the vector instructions.

The SRU 18 calculates a 32-bit value from the 16 PPU outputs and writes this result back to one of the scalar registers r0 to r6, denoted by rx. The scalar unit N and Z flags are both updated by this process, with the C and V flags left unaffected. The modifiers that apply to the SRU are given in Table I.

TABLE I

| Modifier | Description |
| --- | --- |
| PPU0 rx | Place the output of $PPU_0$ into register rx |
| SUM rx | Sum all PPU outputs and place the result in rx |
| IMIN rx | Place the index (0..15) of the minimum PPU output in rx |
| IMAX rx | Place the index (0..15) of the maximum PPU output in rx |

PPU0

The output of the first PPU ($PPU_0$) is placed into scalar register rx, and the scalar flags updated accordingly.

SUM

All active PPUs are summed and the result placed in rx, updating the scalar flags accordingly. If no PPUs are selected, then the result is always zero.

IMIN

The index i (running from 0 to 15) of $PPU_i$ that contains the minimum value of any selected PPUs is placed in rx, and the scalar flags updated. If no PPUs are selected, then the result is −1. If two or more PPUs share the same minimum, the lowest valued index is returned.

IMAX

The index i of $PPU_i$ that contains the maximum value of any selected PPUs is placed in rex, and the scalar flags updated. If no PPUs are selected, then the result is −1. If two or more PPUs share the same maximum, the highest valued index is returned.

None of these SRU modifiers can be mixed with one another.

Figure 8:
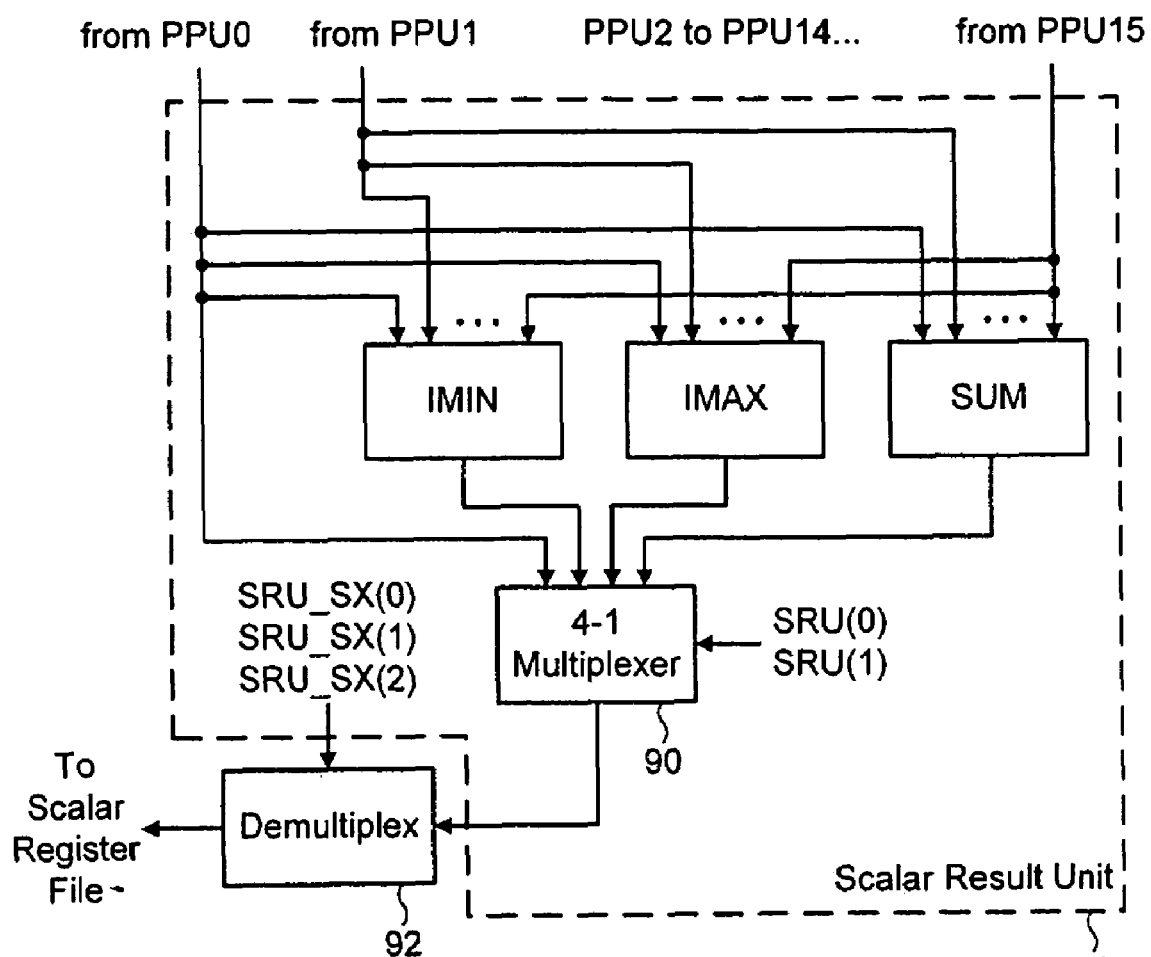
FIG. 8 is a schematic diagram of a scalar result unit.

FIG. 8 is a schematic diagram of the scalar result unit 18. It comprises individual functional units labelled IMIN, IMAX and SUM for respectively implementing those functions. A four to one multiplexer 90 receives the scalar modifier bits SRU[0], SRU[1], which select the appropriate output from the individual functional units IMIN, IMAX and SUM. The four to one multiplexer 90 also receives and input directly from the first pixel processing unit PPU0 to allow the scalar result unit 18 to implement the PPU0 function, as selected by the scalar modifier bits.

A demultiplexer 92 connected to receive the value from the multiplexer 90 is also arranged to receive the scalar modifier bits SRU_SX[ ], which allow the appropriate scalar register selected from $r_0$ to $r_6$ in the scalar register file to be determined.

The invention claimed is:

1. A vector processing system comprising:
   a circuit for receiving an instruction defining multiple value pairs, an operation to be executed and a scalar modifier;
   a plurality of parallel processing units, each arranged to receive one of said value pairs and to implement the defined operation on said value pair to generate a respective result, wherein each parallel processing unit is identified by an index; and
   a scalar result unit for receiving the results of the parallel processing units and for using said results in a manner defined by the scalar modifier to return the index of one of the plurality of parallel processing units.

2. The vector processing system according to claim 1, wherein the scalar results unit is operable to generate as a single output value the result received from a predetermined one of said parallel processing units.

3. The vector processing unit according to claim 1, wherein the scalar results unit is operable to sum the results of die parallel processing units, a single output value being the sum of the results.

4. The vector processing system according to claim 1, wherein the scalar results unit returns the index of the minimum result.

5. The vector processing system according to claim 1, wherein the scalar results unit returns the index of the maximum result.

6. The vector processing system according to claim 1, wherein each parallel processing unit comprises at least one flag, and wherein a selected parallel processing unit is selectable for operation in dependence on a condition defined by said at least one flag, when compared with a condition defined in the instruction to be executed.

7. The vector processing system according to claim 6, wherein the scalar result unit processes the results only of selected ones of the parallel processing units.

8. The vector processing system according to claim 1, wherein the system further comprises a vector register file for holding packed operands, each operand comprising multiple values.

9. The vector processing system according to claim 1, wherein the system further comprises a scalar unit for performing a scalar instruction on a pair of input Values.

10. The vector processing system according to claim 9, wherein the scalar unit comprises a plurality of scalar registers.

11. The vector processing system according to claim 10, wherein a single output value of the scalar result unit is supplied to one of said scalar registers as defined by the instruction.

12. A method of vector processing, the method comprising:
   supplying a plurality of value pairs to a plurality of parallel processing units;
   executing an operation in the parallel processing units, thereby generating a plurality of vector results; and
   processing the plurality of vector results according to a scalar modifier to return an index of one of the plurality of parallel processing units.

13. The method according to claim 12, wherein the method further comprises:
   supplying the index value to a scalar register.

14. The method according to claim 12, wherein vector results associated with an active parallel processing unit an included while processing the plurality of vector results.

15. The method according to claim 12, wherein the vector results of the parallel processing units are written to a vector register file.

16. The method of claim 12, wherein the index indicates the location of the minimum vector result.

17. The method of claim 12, wherein the index indicates the location of the maximum vector result.

18. An integrated circuit for vector processing, wherein the integrated circuit comprises:
   a memory having stored thereon a computer program comprising a sequence of instructions including vector instructions, each vector instruction defining
   multiple value pairs,
   an operation to be executed, and
   a scalar modifier; and
   a processor for executing the operation on each of said value pairs to generate a plurality of results, wherein the scalar modifier determines how said plurality of results are processed to generate a single output value that is an index of a result in said plurality of results.

19. The integrated circuit of claim 18, wherein the index indicates the location of the minimum result.

20. The integrated circuit of claim 18, wherein the index indicates the location of the maximum result.

* * * * *